2,894,020
BORATES

Robert J. McManimie, Dayton, Ohio, assignor to Monsanto Chemical Company, St. Louis, Mo., a corporation of Delaware No Drawing. Application October 30, 1957
Serial No. 693,269

6 Claims. (Cl. 260—462)

The present invention relates to organic borates and more particularly provides new and valuable cyclic orthoborates and the method of producing the same.

Organic borates are generally well-known in the art and numerous borates have been reported to be obtained by the reaction of aliphatic diols and a boron source such as boric acid, boron acetate or boron trichloride. It is also well-known that the nature of the borate obtainable from a boron source and a diol may depend upon the ratio of the reactants. Thus, depending upon the quantity of boron source, ethylene glycol has been reported to yield either (I) glycol monoborate, (II) a triglycol diborate or (III) tris($\beta$-hydroxyethyl)borate:

(I) 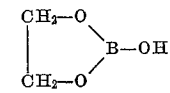

(II) 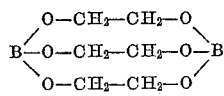

(III) 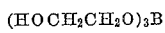

The above compounds are obtained, of course, from either one mole of a boron source and one mole of glycol, or two moles of a boron source and three moles of glycol, or one mole of a boron source and three moles of glycol. The triglycol diborate (II) shown above was obtained by using three moles of the same glycol, i.e., ethylene glycol; accordingly, it may be characterized as a simple triglycol diborate.

Generally, the types of borate shown above have been somewhat of academic interest to the art because they were known to undergo hydrolysis when contacted with even very small amounts of moisture. Now I have found that more stable organic borates are obtained when two moles of a boron source is reacted under dehydrating conditions with three moles of two different diols of the kind which will be hereinafter defined. The fact that for the preparation of the present products, there are required two moles of a boron source and three moles of diol would indicate a structure of the type II above. I have found, however, that triglycol diborates of totally different type of structure are formed by reacting together a mixture of:

(a) Two moles of a diol in which the hydroxy radicals are joined to two different carbon atoms which are separated by a single carbon atom.

(b) One mole of a diol in which the hydroxy radicals are joined to two different carbon atoms which are separated by a chain of two or more atoms.

(c) Two moles of orthoboric acid ($H_3BO_3$) or a material which will yield said acid on hydrolysis, e.g., boron trichloride or a lower alkyl ester of boric acid.

It will be recognized from the above description that constituent (a) above will have a structure which may be illustrated by the formula

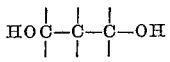

This is structurally a 1,3-diol. The dangling valences in the above formula may be satisfied by any of the usual substituents common in this type of diol. These may be hydrogen, alkyl, aryl, halogen, nitro, amino, N-alkylamino or N-dialkylamino. Insofar as the location of these substituents is concerned, the hydrogen, alkyl, or aryl radicals may be on any of the carbon atoms of the diol. For best results, other substituents, if any, should be restricted to the non-oxygen bearing carbon atoms. The nature of the substituents is unimportant from the standpoint of the present reaction; however, it will be realized that by suitable choice of substituent in connection with the above-mentioned dangling valences, it is possible to prepare a great many correspondingly substituted boric acid esters. From a practical standpoint, particularly with respect to utilization of the present mixed borates, it is recommended that the useful 1,3-diol be limited to a total carbon content of from, say, 3 to 18 carbon atoms.

Constituent (b) above obviously has the structure

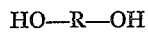

in which R is a bivalent organic radical containing a chain of at least two atoms between the carbons carrying the —OH groups. Examples of bivalent radicals representative of R will be alkylene radicals having a chain of at least four carbon atoms and a total of not more than 12 carbon atoms, e.g., the butylene, the hexylene and the phenylbutylene radicals; alkyleneoxyalkylene radicals where the carbon atoms in both alkylene radicals numerically total at least four, e.g., the ethyleneoxyethylene and the propyleneoxypropylene radical; alkylenethioalkylene radicals where the carbon atoms in both alkylene radicals also numerically total at least four, e.g., the ethylenethioethylene or the ethylenethiobutylene radicals; arylene radicals or mixed arylene and alkylene radicals, e.g., the phenylene, the naphthylene or xylenyl radicals. The alkylene and arylene radicals may carry substituents common to this type of diol. In general, the bivalent radical R should have a total of from 4 to 18 carbon atoms.

The constituent (c) above is either orthoboric acid or any boron compound which yields orthoboric acid such, for example, as boric anhydride or an ester of orthoboric acid. It will be understood that the term "orthoboric acid" as used in the specification and claims includes such boron sources.

The new compounds prepared according to the present process are represented by the formula:

(IV) 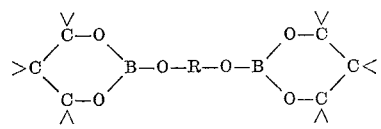

wherein the dangling valences are satisfied by the substituents present in constituent (a) as described above. R in the above formula represents the bivalent organic radical referred to above in connection with the constituent (b).

Employing mixtures of diols decided differences are shown in a series of compounds prepared from 2,5-hexanediol and 2-ethyl-1,3-hexanediol as the glycol constituent. The product obtained from 0.20 mole of the 2,5-hexanediol, 0.1 mole of 2-ethyl-1,3-hexanediol and 0.20 mole of boric acid has B.P. 187–190° C./0.28 mm. It condenses all along the vapor path in distillation attempts to form a transparent semi-solid, melting at 110–150° C., and analyzing 60.33% carbon and 5.43% boron. When the proportion of these diols is changed to 0.33 mole of 2,5-hexanediol, 0.67 mole of 2-ethyl-1,3-hexanediol and 0.67 mole of boric acid is used with said mixture, the product distills readily to give a viscous, colorless liquid, B.P. 201–202° C./0.7 mm. and analyzing 63.45% carbon and 4.76% boron. The distillation characteristics of these products suggests that the 2,5-hexanediol is not involved in ring formation when 2-ethyl-1,3-hexanediol is present in sufficient quantity to form one ring per boron atom. Substantially equimolar proportions of the 1,3-diol and boric acid source are required to form a readily distillable mixed triglycol diborate. In that way, the reaction mass is essentially an equilibrium mixture favoring formation of product having the structure IV shown above.

Examples of 1,3-diols, i.e., the constituent (a), which are useful for the preparation of the present mixed triglycol diborates are: 2-ethyl-1,3-hexanediol, 1,3-propanediol, 1,3-butanediol, 2-methyl-1,3-butanediol, 2,4-dimethyl-2,4-pentanediol, 2,3,3,4-tetramethyl-2,4-pentanediol, 2,2-dimethyl-1,3-butanediol, 1-phenyl-1,3-butanediol, 2-amino-2-ethyl-1,3-propanediol, 2-amino-1-phenyl-1,3-propanediol, 2-butyl-1,3-propanediol, 2,2-dichloro-1,3-propanediol, 2-hexylamino-1-phenyl-1,3-propanediol, 2,4-pentanediol, 1,5-dichloro-2,4-pentanediol, 1-bromo-3-nitro-2,4-pentanediol, 1,1,1-trifluoro-2,4-pentanediol, 2,4,4-trimethyl-3,5-octanediol, 3-cyclohexyl-1,3-butanediol, 2,3-dimethyl-1-phenyl-1,3-butanediol, 1,3-hexanediol, 2-isopropyl-5-methyl-1,3-hexanediol, 2,4-hexanediol, 3-ethyl-2,4-hexanediol, 3-methyl-4-pentyne-1,3-diol, etc.

Examples of the co-reacting diols, i.e., constituent (b), which are presently useful are dipropylene glycol, 2,5-hexanediol, thiodiglycol, 1,4-butanediol, 2,3-dichloro-1,4-butanediol, 1,2-diphenyl-1,4-butanediol, 2-isopropyl-1,4-butanediol, 2,3-dimethyl-2-butene-1,4-diol, 1,1,4,4-tetraphenyl-2-butene-1,4-diol, 1,4-cyclohexanediol, 3,5,5-trimethyl-2-cyclohexene-1,4-diol, diethylene glycol, 2,2'-dihydroxydiethylamine, hydroquinone, diethanolamine, dipropanolamine, 1,4-pentanediol, 3,4-diphenyl-1,4-pentanediol, 5-amino-1,4-pentanediol, 1,3-dicyclohexyl-1,5-pentanediol, 2-(ethoxymethyl)-2,4-dimethyl-1,5-pentanediol, 4-methyl-1,1-diphenyl-2-pentyne-1,4-diol, bis(2-hydroxypropyl)sulfide, bis(4-hydroxyphenyl)sulfone, bis(2-hydroxybenzyl)ether, 4-(hydroxyphenyl)-cyclohexanol, 2,7-dinitro-3,6-octanediol, etc.

The present triglycol diborates may be generically referred to as bis(dioxabora-2-cyclohexyloxy)alkanes when they are prepared from the aliphatic 1,3-diol and a paraffinic diol having at least two atoms separating the carbon radicals to which the hydroxy radicals are attached.

The dioxabora-2-cyclohexyl portion of the radical corresponds to the boron-containing ring:

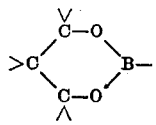

which is attached through the oxy radical to the backbone of the constituent (B) diol with which the aliphatic 1,3-diol has been admixed. Said dioxabora-2-cyclohexyl ring is thus derived from the 1,3-diol. A simple example of the presently provided mixed triglycol diborates is that which is obtained from, say, propane-1,3-diol and butane-1,4-diol, i.e., 1,4-bis(1,3-dioxabora-2-cyclohexyloxy)butane.

The presently provided mixed triglycol diborates of the structure IV are distillable compounds of good thermal stability. They are advantageously employed for a variety of commercial and agricultural purposes, e.g., as plasticizers for synthetic resins and plastics, as anti-wear lube oil film strength improvers, agents in lubricants, as antioxidants in the compounding and vulcanizing of natural and synthetic rubbers, as fuel additives to prevent pre-ignition, and as biological toxicants, particularly herbicides.

In preparing the present triglycol diborates, I operate substantially as follows: the 1,3-diol is mixed with the other diol and the boric acid source in the desired 2:1:2 ratio in the presence or absence of an inert diluent or solvent and the whole is heated while removing the water which is formed in the reaction. Removal of the water is effected conventionally by operating in the presence of an organic solvent which forms an azeotrope therewith, e.g., benzene, xylene, toluene, kerosene, carbon tetrachloride, etc. In general, any inert liquid which forms a constant boiling mixture with water may be used. When water ceases to be evolved, the reaction mixture is submitted to distillation whereby the mixed triglycol diborate distills off. Operating in this manner, no residue remains in the reaction vessel, as would be expected if a borate of an undistillable nature had been obtained. Reaction of the boric acid source with the mixture of diols may be effected in the presence of an acidic or basic dehydrating catalyst, e.g., sodium methoxide or toluenesulfonic acid; however, a catalyst need not be employed. The reaction temperature employed is not critical and in general will be the boiling temperature of the azeotropic mixture utilized. It may, of course, be changed by conducting the reaction under sub-atmospheric as well as super-atmospheric pressures.

The invention is further illustrated, but not limited, by the following examples:

Example 1

A mixture consisting of 0.667 mole of boric acid, 0.667 mole of 2-ethyl-1,3-hexanediol and 0.333 mole of 2,5-hexanediol was refluxed in benzene. Water (102% of theory) was azeotropically removed. The remaining product was then distilled at reduced pressure to give the triglycol diborate, i.e., 2,5-bis(5-ethyl-4-propyl-1,3,2-dioxabora-2-cyclohexyloxy)hexane, B.P. 201–202° C./7 mm., $n_D^{25}$ 1.4527 and analyzing as follows:

|  | Found | Calculated for $C_{22}H_{44}O_6B_2$ |
|---|---|---|
| Percent C | 61.24 | 61.99 |
| Percent H | 11.14 | 10.40 |
| Percent B | 5.02 | 5.07 |

No solid residue remained in the flask.

Example 2

A mixture consisting of 0.4 mole of boric acid, 0.4 mole of 2-ethyl-1,3-hexanediol and 0.2 mole of dipropylene glycol in benzene was refluxed. When water ceased to be azeotropically removed, the reaction mixture was distilled to give the mixed triglycol diborate, i.e., 2,2'-bis(5 - ethyl - 4 - propyl - 1,3,2 - dioxabora - 2 - cyclohexyloxy)propoxypropane, B.P. 206° C./0.9 mm. to 215° C./0.75 mm. This was refractionated to give the pure compound, B.P. 210–214° C./0.9 mm. $n_D^{25}$ 1.4521 which analyzed as follows:

|  | Found | Calculated for $C_{22}H_{44}B_2O_7$ |
|---|---|---|
| Percent C | 57.97 | 59.74 |
| Percent H | 10.70 | 10.02 |
| Percent B | 4.77 | 4.89 |

Example 3

A mixture consisting of two moles of 2-ethyl-1,3-hexanediol, one mole of 2-butene-1,4-diol and two moles of boric acid in 60 ml. of benzene was refluxed while removing an azeotrope of benzene and water. When reaction water was no longer evidenced, the reaction mixture was distilled to give the substantially pure 1,4-bis(5-ethyl - 4 - propyl - 1,3,2 - dioxabora - 2 - cyclohexyloxy) - 2-butene, B.P. 196–200° C./0.33 mm., $n_D^{25}$ 1.4630, a viscous, colorless liquid which analyzed as follows:

|  | Found | Calculated for $C_{20}H_{38}B_2O_6$ |
|---|---|---|
| Percent C | 60.74 | 60.63 |
| Percent H | 9.96 | 9.66 |
| Percent B | 5.26 | 5.46 |

Example 4

A mixture consisting of 1.5 moles of 2-ethyl-1,3-hexanediol, 0.75 moles of 2-butyne-1,4-diol and 1.5 moles of boric acid were mixed together in 80 ml. of benzene. The benzene was heated to refluxing temperature and the water which was formed was azeotropically removed. Distillation of the reaction mixture gave the viscous, yellow 1,4 - bis(5 - ethyl - 4 - propyl - 1,3,2 - dioxabora - 2 - cyclohexyloxy)-2-butyne, B.P. 210–214° C./0.36 mm., $n_D^{25}$ 1.4646, and analyzing as follows:

|           | Found | Calculated for $C_{20}H_{36}B_2O_6$ |
|-----------|-------|-------------------------------------|
| Percent C | 59.95 | 60.94 |
| Percent H | 9.32  | 9.20  |
| Percent B | 5.19  | 5.49  |

Example 5

A mixture consisting of 0.8 mole of 2-ethyl-1,3-hexanediol, 0.4 mole of thiodiglycol and 0.8 mole of boric acid was refluxed in 100 ml. of benzene until evolution of water had ceased. Distillation of the reaction mixture gave the pale-yellow, viscous liquid 2,2'-bis(5-ethyl-4-propyl - 1,3,2 - dioxabora - 2 - cyclohexyloxy)ethyl sulfide, B.P. 221–224° C./0.5 mm., $n^{25}_D$ 1.4704, and analyzing as follows:

|           | Found | Calculated for $C_{20}H_{40}B_2O_6S$ |
|-----------|-------|--------------------------------------|
| Percent C | 56.05 | 55.83 |
| Percent H | 9.45  | 9.37  |
| Percent B | 4.85  | 5.02  |

The presently obtained triglycol diborate has been found to have a selective pre-emergent herbicidal effect. At a concentration of 10 lbs./acre, it completely inhibited the germination and growth of wild oat, cheat grass and buckwheat while not in any way inhibiting the germination of either cotton or corn.

Example 6

In this example, one of the diols is hydrogenated bisphenol (a), i.e., 4,4'-isopropylidenedicyclohexanol. A mixture consisting of 0.2 mole of said hydrogenated bisphenol, 0.4 mole of 2-ethyl-1,3-hexanediol and 0.4 mole of boric acid was refluxed in benzene solution until reaction water was no longer evolved. After heating the reaction mixture at a temperature of just above the boiling point of said hydrogenated bisphenol in order to remove any unreacted material, there was obtained as residue a 94.5% yield of the 4,4'bis(5-ethyl-4-propyl-1,3,2 - dioxabora - 2 - cyclohexyloxy)isopropylidenedicyclohexane.

Example 7

This example shows testing of the triglycol diborates of Examples 1–5 as plasticizers for polyvinyl chloride. Respective mixtures consisting of 60 parts by weight of polyvinyl chloride and 40 parts by weight of one of said triglycol diborates were milled on a rolling mill to a homologous blend. Molded sheets of the milled blends were clear, transparent and substantially colorless. Testing of the molded sheets for low temperature flexibility by the Clash-Berg method gave the following values:

Product tested:         °C.
- Example 1 _____ −22.6
- Example 2 _____ −24.9
- Example 3 _____ −22.9
- Example 4 _____ −18.8
- Example 5 _____ −24.9

Testing of the kerosene resistance of the plasticized products was conducted by immersing 40 ml. thick, 2-inch circles of the same in kerosene for 24 hours at 50° C. and then drying the test samples for 44 hours at 50° C. Determination of the change in weight of the dried test samples gave the following plasticizer loss values:

Product tested:        Percent loss
- Example 1 _____ 5.8
- Example 2 _____ 8.5
- Example 3 _____ 9.5
- Example 4 _____ 9.6
- Example 5 _____ 9.5

The above values show very good plasticizer retention since under the same test conditions polyvinyl chloride plasticized with dioctylphthalate, a commonly used commercial plasticizer, gives a plasticizer loss of 80%.

Example 8

Test for hydrolytic stability of the triglycol diborates of Examples 1–5 was effected by adding one drop of water to a solution consisting of 20 drops of the triglycol diborate in 5 ml. of benzene. The solutions remained clear and unchanged, whereas similar testing of prior art borates results in immediate haziness. Also, whereas such borates as tri-n-butyl, tri-n-amyl or tri-n-dodecyl borate give cloudy mixtures and precipitate in less than 5 minutes after introduction into moist benzene, the present products are clear not only at the end of the 5 minute period but also after a period of days.

What I claim is:

1. A compound of the formula

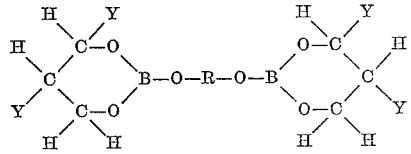

in which R is selected from the class consisting of the bivalent alkyleneoxyalkylene, alkenylene, alkinylene and alkylenethioalkylene radicals of from 4 to 18 carbon atoms and the isopropylidenedicyclohexylene radical, and Y is an alkyl radical of up to 3 carbon atoms.

2. 4,4' - bis(5 - ethyl - 4 - propyl - 1,3,2 - dioxabora - 2 - cyclohexyloxy)isopropylidenedicyclohexane.

3. 2,2' - bis(5 - ethyl - 4 - propyl - 1,3,2 - dioxabora - 2 - cyclohexyloxy)propoxypropane.

4. 1,4 - bis(5 - ethyl - 4 - propyl - 1,3,2 - dioxabora - 2 - cyclohexyloxy)-2-butene.

5. 1,4 - bis(5 - ethyl - 4 - propyl - 1,3,2 - dioxabora - 2 - cyclohexyloxy)-2-butyne.

6. 2,2' - bis(5 - ethyl - 4 - propyl - 1,3,2 - dioxabora - 2 - cyclohexyloxy)ethyl sulfide.

References Cited in the file of this patent
UNITED STATES PATENTS

| 2,642,453 | Lippincott | June 16, 1953 |
| 2,741,548 | Darling et al. | Apr. 10, 1956 |